United States Patent [19]

Jones et al.

[11] Patent Number: 4,530,704
[45] Date of Patent: Jul. 23, 1985

[54] SELECTIVE ABSORPTION OF SO₂ FROM GASES CONTAINING THE SAME

[75] Inventors: Mark B. Jones; Allan E. Fowler, both of Lake Jackson, Tex.

[73] Assignee: The Dow Chemical Company, Midland, Mich.

[21] Appl. No.: 562,771

[22] Filed: Dec. 19, 1983

[51] Int. Cl.³ .............................................. B01D 47/00
[52] U.S. Cl. ............................................. 55/48; 55/73
[58] Field of Search ...................... 55/73, 48; 423/243, 423/228

[56] References Cited

U.S. PATENT DOCUMENTS

| | | | |
|---|---|---|---|
| 3,856,921 | 12/1974 | Shrier et al. | 423/228 |
| 4,112,049 | 9/1978 | Bozzelli et al. | 423/243 |
| 4,336,223 | 6/1982 | Appl et al. | 55/73 |

*Primary Examiner*—Bernard Nozick
*Attorney, Agent, or Firm*—Glwynn R. Baker

[57] ABSTRACT

There is disclosed a process for selectively removing and recovering sulfur dioxide from a gas stream containing the same by contacting the gas with an absorbent (an aqueous solution of a piperazine, piperazinone or a morpholinone) and thermally regenerating the absorbent (i.e. releasing the sulfur dioxide from the absorbent) for reuse in the contacting step.

7 Claims, 1 Drawing Figure

SELECTIVE ABSORPTION OF SO₂ FROM GASES CONTAINING THE SAME

BACKGROUND OF THE INVENTION

Numerous patents and literature describe techniques for removing sulfur compounds from gas stream containing the same. By far the most common technique is that used to treat natural gas having one or more of the acid gases, $H_2S$, $SO_2$, COS and $CO_2$ with an aqueous liquid lean (with respect to the acid gases) absorbent to produce a rich absorbent stream and regenerate the rich absorbent stream by thermal treatment to produce a recycleable lean stream. Many compounds have been suggested and used as the absorbent, some to selectively remove $H_2S$ or $CO_2$ and others more general in nature to remove as much of each of the acid gases present as is possible. Now, with the renewed interest in coal fired boilers and the like coupled with the greater concern for the environment, there is a need to provide a low pressure, at or below atmospheric, low temperature selective process to remove sulfur dioxide from the flue gases emitted from such plants without removal of any major portion of the carbon dioxide. One process for removing the $SO_2$ widely in use today is the old and well documented limestone scrubbing process. The disadvantage of this process is that there is produced a large volume of solid waste, calcium sulfite-sulfate, often contaminated with fly ash, which must be disposed of. In certain areas of the country, that is in those areas which have paper pulp operations being carried out, the waste is oftentimes usable, but such situations are not widespread.

Another system recently in the forefront is the use of potassium or sodium citrate as disclosed and taught in U.S. Pat. No. 4,366,134. While the absorbent is regenerated and recycled, the make-up costs can be high due to thermally stable salts being formed. In addition, it has been found to be necessary to employ stainless steel for the entire plant to prevent excessive corrosion of the metals.

It would be advantageous to have a process which selectively absorbs sulfur dioxide to the almost exclusion of the other acid gases, particularly carbon dioxide, which has low chemical make-up cost, reduced operating costs and permits economical construction of equipment to process low pressure, high volume, gas streams, such as flue gas, to reduce or eliminate the sulfur dioxide content of such gases.

BRIEF DESCRIPTION OF THE INVENTION

In accordance with the present invention a gas stream containing sulfur dioxide and carbon dioxide which may also contain one or more of the other acid gases, for example $H_2S$, COS, commonly associated with hydrocarbon, natural or synthetic and/or combustion gases (flue gas) is contacted in an absorber with a lean aqueous absorbent solution containing from about 0.1 molar to the saturation content of at least one of a piperazinone or morpholinone compound having the general formula

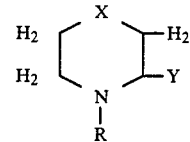

wherein X represents oxygen or $=NR'$; Y represents $H_2$ or oxygen; and each of R and R' represent an independently selected lower alkyl moiety of 1 to 5 carbon atoms.

The rich absorbent, containing most of the $SO_2$ and little of the $CO_2$, is removed from the contactor and thermally regenerated to produce a lean absorbent solution for recycle to the absorber.

The absorber (contactor) is preferably operated at from 5° to about 95° C. under about atmospheric pressure conditions. Higher temperatures and pressures do not materially effect the process although equipment design may require modification to handle the higher temperatures and pressures.

The concentration of the sulfur dioxide in the gas streams may vary from about 10 ppm to about 45 percent by volume of the gas stream being treated.

The process for regeneration may be one of the conventional methods employed in conventional gas sweetening units as well as by steam stripping.

DETAILED DESCRIPTION OF THE INVENTION

Figure 1:
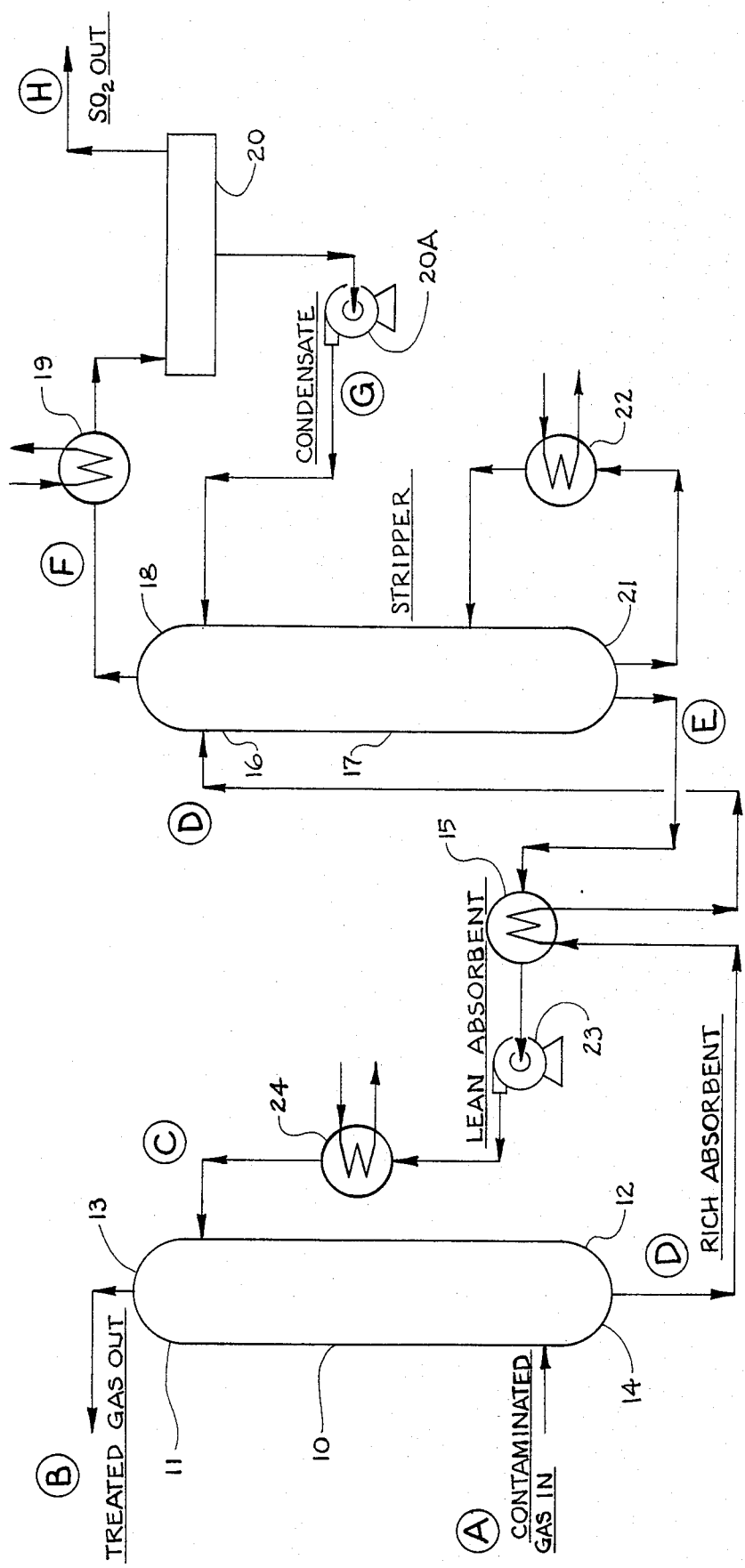
FIG. 1 represents a schematic diagram of the essential components of a process used to treat gases in accordance with the present invention.

An integrated absorber-stripper (contactor-regenerator), as illustrated in FIG. 1, was constructed by piping a ten tray Oldershaw column, 10, having a one inch internal diameter and 1¼ inch tray spacings in a manner to receive a lean absorbent solution at its upper end, 11, and a contaminated gas stream at its lower end, 12. The top, 13, and bottom, 14, were each independently piped to collect the treated gas at the top and the rich absorbent at the bottom, respectively. The rich absorbent was piped to a shell and tube cooler, 15, which passed the hot lean absorbent on the shell side and the cool rich absorbent on the tube side. The rich absorbent was then delivered to the upper end, 16, of a stripper, 17. The stripper, 17, was a two-foot one-inch internal diameter column packed with ¼ inch Berl saddles. The sulfur dioxide exited the top, 18, with some water vapor and was sent to a condenser, 19, wherein the water vapor was condensed and the condensate and sulfur dioxide sent to a degasifier, 20, from which the sulfur dioxide was vented and the condensate returned via pump, 20A, to the top, 18, of the stripper, 17, as reflux. The liquid collecting in the bottom, 21, of the stripper, 17, was substantially lean absorbent, a part of which was passed through a reboiler, 22, and back into the stripper below the packed section. The remainder of the lean absorbent collecting in the bottom, 21, was piped to the cooler, 15, wherein it gave up most of its heat to the rich absorbent. The cool absorbent was drawn to the intake side of a pump, 23, passed through another cooler, 24, and then to the lean feed point of the absorber, 10.

The data collected from several runs is set forth in the table below. The alphabetic headings refer to like alphabetically numerated streams in FIG. 1.

TABLE

|  | Mol Wt | A Feed Gas | B Treated Gas | C Lean Soln | D Rich Soln | E Lean Soln | F Acid Gas/Water | G Condensate | H Acid Gas |
|---|---|---|---|---|---|---|---|---|---|
| | | | lbs/hr | | | | | | |
| $H_2O$ | 18.0 | | | 0.63 | 0.63 | 0.63 | 0.65 | 0.65 | 0.001 |
| $CO_2$ | 44.0 | .01908* | 0.1908 | | | | | | |
| $N_2$ | 28.17 | 0.7105 | 0.7105 | | | | | | |
| $O_2$ | 32.0 | | | | | | | | |
| $SO_2$ | 64.06 | 0.014 | 3 ppm $6.6 \times 10^{-6}$ | 0.0045 | 0.0185 | 0.0045 | 0.014 | | 0.014 |
| $SO_3$ | 80.06 | | | | | | | | |
| NNDP** | 128.17 | | | 0.03 | 0.03 | 0.03 | | | |
| | | 0.9153 | 0.901 | 0.665 | 0.6785 | 0.665 | 0.664 | 0.65 | 0.015 |

*Numbers were normalized to Balance
**N,N—dimethylpiperazinone

A series of tests were run to screen the efficiency of various compounds known to absorb $SO_2$ with respect to their absorbent characteristic for $CO_2$. The equipment, a steel bomb filled with glass balls, was fitted with a valve at one end through which $CO_2$ and absorbent could be added. The bomb was also fitted with a pressure sensing instrument. The bomb was pressurized to 760 mm Hg with $CO_2$ and filled with a measured quantity of a 1 molar solution of a specific absorbent. The bomb was then left at ambient temperature ca 24° C., or heated as indicated in the table below, to various temperatures and the pressure drop measured over a 10 minute period for each condition. The results were as follows:

| Absorbant | Cell Temp. °C. | Moles $CO_2$/Mole Absorbant |
|---|---|---|
| Water | 24 | 0.046 |
| 1 M triethanolamine | 24 | 0.27 |
| | 50 | none[1] |
| 1 M N,N dimethylpiperazinone | 23 | 0.08 |
| | 75 | none |
| 1 M triethylene glycol | 24 | none[2] |
| 1 M neutralized citric acid | 24 | none[3] |
| 1 M DETA[4] | 24 | 1.33 |
| | 65 | 0.95 |
| | 74 | 0.76 |
| 1 M $Na_2SO_3$ | 24 | 0.17 |
| | 44 | 0.16 |
| | 74 | 0.1 |

[1]High losses due to high vapor pressure.
[2]Degrades in presence of oxygen.
[3]Solvent used in U.S. Pat. No. 4,366,134, corrosive.
[4]Diethylenetriamine Using the ten tray Oldershaw column described previously various compounds were tested for $CO_2$ and $SO_2$ absorption characteristics. A synthetic $N_2/CO_2/SO_2$ gas mixture of the composition set forth in the following table was fed to the bottom of the column at 55° C. and 4/5 liters/minute. The liquid flow at the top was about 10 cc/minute. The analysis of the gas in and out was obtained and weight percent $CO_2$ and/or $SO_2$ absorbed calculated. The results are set forth below.

ABSORPTION STUDIES

| COMPOUND | WT. % GAS IN FEED | | | WT. % GAS OUT | | | % ABSORBED | |
|---|---|---|---|---|---|---|---|---|
| | $N_2$ | $CO_2$ | $SO_2$ | $N_2$ | $CO_2$ | $SO_2$ | $CO_2$ | $SO_2$ |
| WATER | 78.78 | 19.85 | 1.43 | 79.56 | 19.27 | 1.15 | 3.8 | 19.5 |
| NNDP | 79.01 | 19.97 | 1.02 | 79.58 | 20.41 | — | — | 100 |
| K CITRATE | 74.44 | 17.74 | 7.82 | 79.83 | 20.17 | — | — | 100 |
| | 69.23 | 16.86 | 13.91 | 80.23 | 19.77 | — | — | 100 |
| M-pyrrol | 78.36 | 20.19 | 1.43 | 78.62 | 19.90 | 1.32 | 1.47 | 7.7 |
| N,N Dimethylpiperazine | 79.01 | 19.51 | 1.48 | 79.76 | 20.24 | trace | — | 99 |
| Morpholine | 78.16 | 20.39 | 1.45 | 79.78 | 20.22 | trace | — | 99 |
| Tetramethylene sulfone | 78.22 | 20.15 | 1.63 | 77.94 | 19.95 | 1.35 | 2.65 | 17.2 |
| Aminoethylpiperazine +3PO | 77.95 | 20.44 | 1.61 | 78.97 | 21.03 | — | — | 100 |
| DETA | 74.27 | 17.60 | 8.13 | 80.69 | 19.31 | — | — | 100 |
| | 73.86 | 17.94 | 8.19 | 83.82 | 16.17 | — | 20.58 | 100 |

$SO_2$ ABSORPTION; 20 WT % NNDP; HIGH $SO_2$ LOADING
5 cc/min Liquid Feed; 781 mm Hg Pressure Absolute, ca 0.195 ft³/min gas in and 0.184 ft³/min gas out

| Temperature °C. | | | |
|---|---|---|---|
| Absorbent Feed In | 56 | 56 | 57 |
| Gas Feed In | 25 | 25 | 25 |
| Wt. % Gas In | | | |
| $N_2$ | 77.17 | 75.18 | 73.27 |
| $CO_2$ | 19.65 | 19.70 | 19.00 |
| $SO_2$ | 3.18 | 5.12 | 7.73 |
| Wt. % Gas Out | | | |
| $N_2$ | 79.78 | 80.35 | 78.97 |
| $CO_2$ | 20.52 | 19.65 | 20.76 |
| $SO_2$ | .001 | .001 | .269 |
| ppm $SO_2$ by Drager | 10 | 10 | too high to measure |

This run established that NNDP will absorb in excess of one mole of $SO_2$ per mole of NNDP.

STRIPPER
4 cc/min Liquid Feed;
761 mm Hg Pressure Absolute

| Wt % $SO_2$ | | | | |
|---|---|---|---|---|
| Liq (in) | 7.5 | 7.5 | 7.5 | 7.5 |
| Liq (out) | 2.38 | 2.29 | 2.14 | 2.03 |
| Temperatures, °C. | | | | |
| Feed In | 81 | 81 | 82 | 82 |
| Bottoms | 104 | 104 | 104 | 103 |

$SO_2$ ABSORPTION;
20 WT % NNDP
5 cc/min Liquid Feed;
781 mm Hg Pressure

| Cu ft/min Gas | | | | |
|---|---|---|---|---|
| In | 0.173 | 0.176 | 0.176 | 0.177 |
| Out | 0.169 | 0.175 | 0.175 | 0.176 |
| Temperatures °C. | | | | |
| Liquid Feed | | | | |
| At Inlet | 85 | 81 | 80 | 80 |
| Top of Column | 56 | 55 | 54 | 55 |
| Gas In | 25 | 24 | 21 | 22 |
| Bottom of Column | | | | |

| | | | | |
|---|---|---|---|---|
| -continued | | | | |
| Wt. % Gas In | | | | |
| $N_2$ | 77.83 | 78.11 | 77.85 | 77.68 |
| $CO^2$ | 20.56 | 20.27 | 20.66 | 20.75 |
| $SO_2$ | 1.61 | 1.62 | 1.50 | 1.58 |
| Wt. % Gas Out | | | | |
| $N_2$ | 79.10 | 79.40 | 79.03 | 78.92 |
| $CO_2$ | 20.90 | 20.60 | 20.97 | 21.08 |
| $SO_2$ | too low to measure | | | |
| ppm $SO_2$ by Drager | 8 | 8 | 10 | 2 |
| STRIPPER | | | | |
| 761 mm Hg Pressure | 4 | 4 | 5 | 3 |
| cc/min Liquid Feed | | | | |
| Wt % $SO_2$ | | | | |
| Liq (in) | 3.12 | 3.09 | 1.80 | 1.87 |
| Liq (out) | 1.52 | 1.67 | 1.44 | 1.42 |
| Temperatures, °C. | | | | |
| Feed In | 84 | 84 | 80 | 90 |
| Bottoms | 100 | 102 | 102 | 101 |
| $SO_2$ ABSORPTION; | | | | |
| 5 WT % NNDP | | | | |
| 5 cc/min Liquid Feed; | | | | |
| 781 mm Hg Pressure | | | | |
| Cu ft/min Gas | | | | |
| In | 0.195 | 0.195 | 0.195 | 0.195 |
| Out | 0.184 | 0.184 | 0.185 | 0.184 |
| Temperatures °C. | | | | |
| Liquid Feed | | | | |
| At Inlet | 80 | 80 | 80 | 80 |
| At Top of Column | 55 | 55 | 55 | 55 |
| Gas | 21 | 22 | 22 | 21 |
| Bottom of Column | | | | |
| Wt. % Gas In | | | | |
| $N_2$ | 78.41 | 78.93 | 77.27 | 78.41 |
| $CO^2$ | 19.97 | 19.55 | 21.11 | 19.97 |
| $SO_2$ | 1.62 | 1.51 | 1.61 | 1.62 |
| Wt. % Gas Out | | | | |
| $N_2$ | 78.53 | 80.15 | 78.54 | 79.70 |
| $CO_2$ | 21.47 | 19.85 | 21.46 | 20.30 |
| $SO_2$ | .0003 | .0008 | .0003 | .0003 |
| ppm $SO_2$ by Drager | 3 | 8 | 3 | 3 |
| STRIPPER | | | | |
| 4 cc/min Liquid Feed; | | | | |
| 761 mm Hg Pressure | | | | |
| Wt % $SO_2$ | | | | |
| Liq (in) | 2.94 | 2.72 | 2.74 | 2.74 |
| Liq (out) | 0.72 | 0.72 | 0.82 | 0.72 |
| Temperatures, °C. | | | | |
| Feed In | 80 | 86 | 87 | 87 |
| Bottoms | 102 | 103 | 102 | 102 |

These two runs establish that $SO_2$ will be absorbed selectively vis-a-vis $CO_2$ at temperatures above 50° C., the normal water/gas wash temperature, at 5% concentration as well as 20% concentration.

We claim:

1. A method for removing sulfur dioxide from a gas stream containing the same which comprises contacting the sulfur dioxide containing gas with an aqueous solution of a compound selected from the group consisting of a piperazinone and/or morpholinone having the following general formula

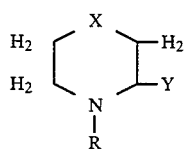

wherein X represents the oxygen, or =NR', Y represents oxygen or $H_2$, and each of R represent an independently selected lower alkyl moiety of 1 to 5 carbon atoms, and recovering the gas, substantially free of said sulfur dioxide, from said aqueous solution.

2. A method for removing sulfur dioxide selectively from a gas stream containing the same and carbon dioxide which comprises contacting the sulfur dioxide containing gas with an aqueous solution of a compound selected from the group consisting of a piperazinone and/or morpholinone having the following general formula

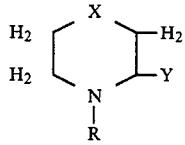

wherein X represents the oxygen, or =NR', Y represents oxygen or $H_2$, and each of R represent an independently selected lower alkyl moiety of 1 to 5 carbon atoms, and recovering the gas, substantially free of said sulfur dioxide, from said aqueous solution.

3. A method for removing sulfur dioxide from a gas stream containing the same which comprises contacting the sulfur dioxide containing gas with an aqueous solution of a compound selected from the group consisting of a piperazinone and/or morpholinone having the following general formula

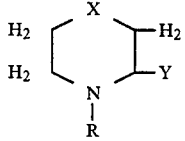

wherein X represents the oxygen or =NR', Y represents oxygen or $H_2$, and each of R represent an independently selected lower alkyl moiety of 1 to 5 carbon atoms or hydrogen, recovering the gas, substantially free of said sulfur dioxide, from said aqueous solution, and thereafter regenerating said aqueous solution to free it from the sulfur dioxide thereby enabling its reuse as an absorbent when contacted with a gas stream containing sulfur dioxide.

4. A method for removing sulfur dioxide selectively from a gas stream containing the same and carbon dioxide which comprises contacting the sulfur dioxide containing gas with an aqueous solution of a compound selected from the group consisting of a piperazinone and/or morpholinone having the following general formula

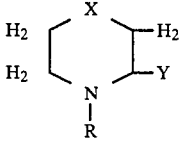

wherein X represents the oxygen or =NR', Y represents oxygen or $H_2$, and each of R represent an independently selected lower alkyl moiety of 1 to 5 carbon atoms or hydrogen, recovering the gas, substantially free of said sulfur dioxide, from said aqueous solution, and thereafter regenerating said aqueous solution to free it from the sulfur dioxide thereby enabling its reuse as an absorbent when contacted with a gas stream containing sulfur dioxide.

5. A method for continuously removing sulfur dioxide from a gas stream containing the same which comprises contacting the sulfur dioxide containing gas with an aqueous solution of a compound selected from the group consisting of a piperazinone and/or morpholinone having the following general formula

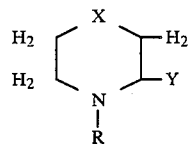

wherein X represents the oxygen, or =NR', Y represents oxygen or H$_2$, and each of R and R' represent an independently selected lower alkyl moiety of 1 to 5 carbon atoms or hydrogen, recovering from the gas, substantially free of said sulfur dioxide, from said aqueous solution and thereafter regenerating said aqueous solution to free it from the sulfur dioxide thereby enabling its reuse as an absorbent when contacted with a gas stream containing sulfur dioxide.

6. A method for continuously removing sulfur dioxide selectively from a gas stream containing the same and carbon dioxide which comprises contacting the sulfur dioxide containing gas with an aqueous solution of a compound selected from the group consisting of a piperazinone and/or morpholinone having the following general formula

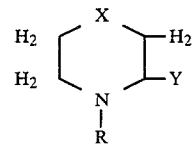

wherein X represents the oxygen, or =NR', Y represents oxygen or H$_2$, and each of R and R' represent an independently selected lower alkyl moiety of 1 to 5 carbon atoms or hydrogen, recovering the gas, substantially free of said sulfur dioxide, from said aqueous solution and thereafter regenerating said aqueous solution to free it from the sulfur dioxide thereby enabling its reuse as an absorbent when contacted with a gas stream containing sulfur dioxide.

7. In the method of any of claims 1–6 wherein N,N-dimethylpiperazinone.

* * * * *